(12) United States Patent
Knox

(10) Patent No.: US 12,039,848 B2
(45) Date of Patent: Jul. 16, 2024

(54) NON-COAXIAL SYSTEMS, METHODS, AND DEVICES FOR DETECTING SMOKE

(71) Applicant: Honeywell International Inc., Charlotte, NC (US)

(72) Inventor: Ronald Knox, Mount Eliza (AU)

(73) Assignee: Honeywell International Inc., Charlotte, NC (US)

( * ) Notice: Subject to any disclaimer, the term of this patent is extended or adjusted under 35 U.S.C. 154(b) by 336 days.

(21) Appl. No.: 17/513,102

(22) Filed: Oct. 28, 2021

(65) Prior Publication Data
US 2023/0138573 A1  May 4, 2023

(51) Int. Cl.
*G08B 17/107*   (2006.01)
*G01S 7/481*   (2006.01)

(52) U.S. Cl.
CPC .......... *G08B 17/107* (2013.01); *G01S 7/4811* (2013.01); *G01S 7/4816* (2013.01)

(58) Field of Classification Search
CPC ... G08B 17/107; G08B 17/103; G01S 7/4811; G01S 7/4816; G01N 21/53
See application file for complete search history.

(56) References Cited

U.S. PATENT DOCUMENTS

| | | | |
|---|---|---|---|
| 4,896,031 A | 1/1990 | Pettersson et al. | |
| 5,477,218 A * | 12/1995 | Manmoto | G08B 17/107 340/630 |
| 5,764,142 A * | 6/1998 | Anderson | G01D 3/032 340/630 |
| 6,181,251 B1 * | 1/2001 | Kelly | G08B 17/00 362/147 |
| 6,225,910 B1 * | 5/2001 | Kadwell | G08B 29/043 340/630 |
| 7,106,187 B2 * | 9/2006 | Penney | G08B 29/145 73/1.01 |
| 7,164,468 B2 | 1/2007 | Correia et al. | |
| 8,422,000 B2 | 4/2013 | Harris et al. | |
| 8,587,442 B2 | 11/2013 | Loepfe et al. | |
| 8,638,436 B2 * | 1/2014 | Dohi | G01N 21/53 340/630 |
| 8,994,942 B2 | 3/2015 | Vollenweider | |
| 9,140,646 B2 * | 9/2015 | Erdtmann | G08B 17/107 |
| 9,201,051 B2 * | 12/2015 | Lewiner | G08B 17/107 |
| 10,019,891 B1 * | 7/2018 | Bajaj | G08B 17/107 |

(Continued)

FOREIGN PATENT DOCUMENTS

DE    102018214209    2/2020
EP    2093734    6/2011

(Continued)

*Primary Examiner* — Curtis J King
(74) *Attorney, Agent, or Firm* — Brooks, Cameron & Huebsch, PLLC

(57) ABSTRACT

Non-coaxial systems, methods, and devices for detecting smoke are described herein. A smoke detection system may comprise a laser emitter configured to emit a laser beam, and a light receiver. The light receiver may comprise a first receiver lens, wherein a field of view of the first receiver lens includes at least a portion of the laser beam. The light receiver may also comprise a second receiver lens, wherein a field of view of the second receiver lens includes at least a portion of the laser beam and a region between an edge of the field of view of the first receiver lens and the laser emitter.

19 Claims, 4 Drawing Sheets

(56) References Cited

U.S. PATENT DOCUMENTS

| | | | |
|---|---|---|---|
| 10,132,611 B2 | 11/2018 | Steffey et al. | |
| 10,324,170 B1* | 6/2019 | Engberg, Jr. | G01S 7/4818 |
| 10,379,540 B2 | 8/2019 | Droz et al. | |
| 10,545,240 B2 | 1/2020 | Campbell et al. | |
| 10,670,719 B2 | 6/2020 | Wang et al. | |
| 10,677,714 B2* | 6/2020 | Lincoln | G01N 21/15 |
| 10,769,921 B2* | 9/2020 | Patel | G08B 29/145 |
| 10,783,771 B2* | 9/2020 | Penney | G08B 29/145 |
| 10,908,264 B2 | 2/2021 | O'Keeffe | |
| 11,506,590 B2 | 11/2022 | Bachels et al. | |
| 2001/0038338 A1* | 11/2001 | Kadwell | G08B 29/043 |
| | | | 340/630 |
| 2005/0057366 A1* | 3/2005 | Kadwell | G08B 17/107 |
| | | | 340/630 |
| 2007/0285265 A1* | 12/2007 | Lax | G08B 17/113 |
| | | | 340/632 |
| 2008/0291037 A1* | 11/2008 | Lax | G08B 17/10 |
| | | | 340/628 |
| 2009/0292213 A1* | 11/2009 | Ferren | A61B 5/415 |
| | | | 600/481 |
| 2010/0073172 A1* | 3/2010 | Lax | G08B 17/10 |
| | | | 340/630 |
| 2010/0194574 A1 | 8/2010 | Monk et al. | |
| 2013/0054187 A1 | 2/2013 | Pochiraju et al. | |
| 2013/0286392 A1* | 10/2013 | Erdtmann | G01N 21/53 |
| | | | 250/338.5 |
| 2013/0286393 A1* | 10/2013 | Erdtmann | G08B 17/107 |
| | | | 250/338.5 |
| 2013/0334417 A1* | 12/2013 | Lewiner | G01N 33/0009 |
| | | | 250/338.5 |
| 2015/0170490 A1* | 6/2015 | Shaw | G01N 21/53 |
| | | | 250/214.1 |
| 2015/0346086 A1* | 12/2015 | Erdtmann | G01N 21/274 |
| | | | 250/574 |
| 2015/0379846 A1* | 12/2015 | Bressanutti | G08B 17/113 |
| | | | 340/630 |
| 2016/0153905 A1* | 6/2016 | Allemann | G08B 17/113 |
| | | | 356/338 |
| 2016/0328936 A1* | 11/2016 | Fischer | G01N 21/53 |
| 2017/0169682 A1* | 6/2017 | Bressanutti | G08B 17/107 |
| 2019/0266868 A1* | 8/2019 | Patel | G08B 17/107 |
| 2019/0383729 A1 | 12/2019 | Lincoln et al. | |
| 2020/0056973 A1 | 2/2020 | Knox et al. | |
| 2020/0152034 A1* | 5/2020 | Duric | G08B 17/107 |
| 2020/0158832 A1 | 5/2020 | Kirillov | |
| 2021/0074138 A1* | 3/2021 | Micko | G08B 21/0492 |
| 2021/0156799 A1* | 5/2021 | Comets | G08B 17/107 |
| 2021/0172851 A1* | 6/2021 | Lincoln | G01S 7/4812 |
| 2021/0215801 A1 | 7/2021 | Reppich et al. | |
| 2023/0134071 A1* | 5/2023 | Griffiths | G08B 5/36 |
| | | | 340/815.4 |
| 2023/0252872 A1* | 8/2023 | Bailey | G01N 21/532 |
| | | | 340/630 |

FOREIGN PATENT DOCUMENTS

| | | |
|---|---|---|
| KR | 10-2182719 | 11/2020 |
| WO | 2020064935 A1 | 4/2020 |
| WO | 2021019308 | 2/2021 |

\* cited by examiner

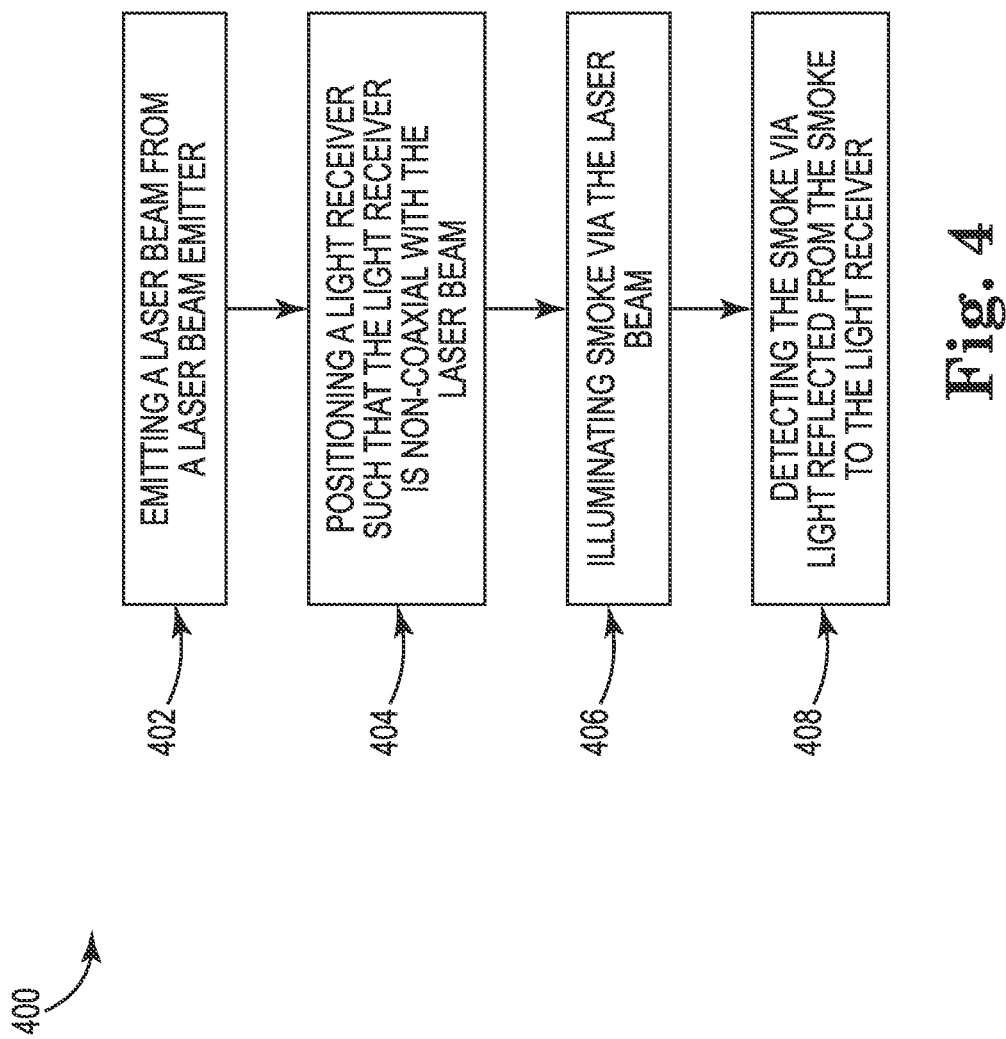

NON-COAXIAL SYSTEMS, METHODS, AND DEVICES FOR DETECTING SMOKE

TECHNICAL FIELD

The present disclosure relates to non-coaxial methods, devices, and systems for detecting smoke.

BACKGROUND

Smoke detection methods, devices, and systems can be implemented in indoor environments (e.g, buildings) or outdoor environments to detect smoke. As an example, a Light Detection and Ranging (LiDAR) smoke detection system can utilize optical systems, such as laser beam emitters and light receivers, to detect smoke in an environment. Smoke detection can minimize risk by alerting users and/or other components of a fire control system of a fire event occurring in the environment.

BRIEF DESCRIPTION OF THE DRAWINGS

FIG. 4 illustrates a method for detecting smoke in accordance with an embodiment of the present disclosure.

DETAILED DESCRIPTION

Figure 1:
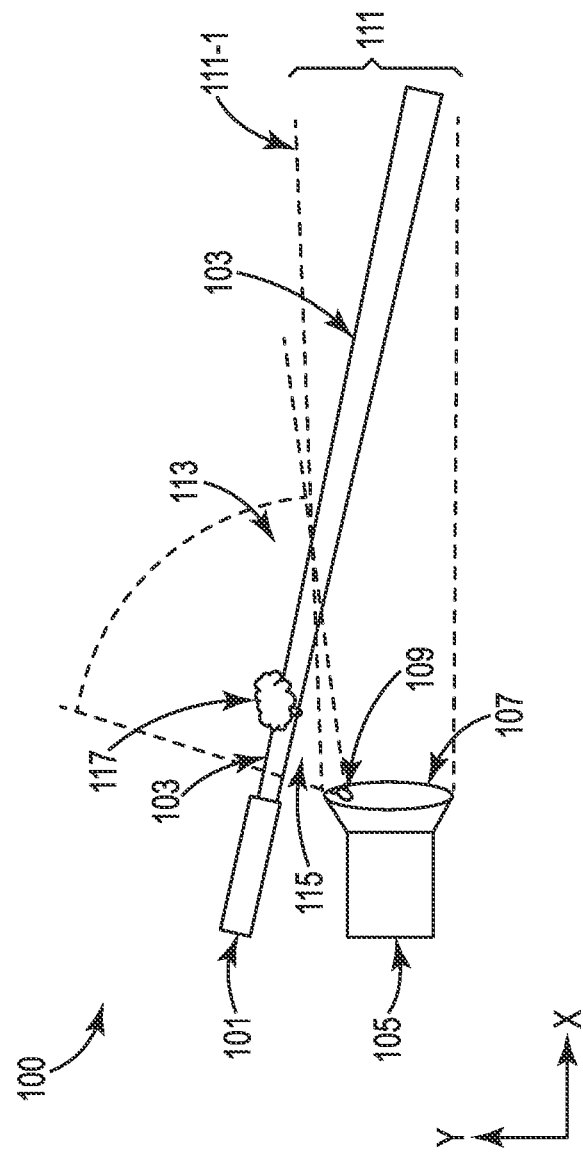
FIG. 1 illustrates a system for detecting smoke in accordance with an embodiment of the present disclosure.

Non-coaxial methods, devices, and systems for detecting smoke are described herein. One or more embodiments include a laser emitter configured to emit a laser beam, and a light receiver. The light receiver may comprise a first receiver lens, wherein a field of view of the first receiver lens includes at least a portion of the laser beam. The light receiver may also comprise a second receiver lens, wherein a field of view of the second receiver lens includes at least a portion of the laser beam and a region between an edge of the field of view of the first receiver lens and the laser emitter.

Certain smoke detection systems may use laser beam emitters in conjunction with light receivers to detect smoke. For example, a smoke detection system may use Light Detection and Ranging (LiDAR) technology to detect smoke. For instance, when a laser beam is emitted in an indoor environment, it may encounter an object, substance, or material and light may be reflected and/or scattered to the light receiver. If no object, substance, or material is present in the path of the laser, the light will instead reflect and/or scatter off a wall of the indoor environment and back to the light receiver. The smoke detection system can determine the difference between a received light signal that has been reflected and/or scattered off a wall or light reflected off another object, substance, or material, because the intensity of the received light signal will be considerably greater if it has been reflected and/or scattered off a wall as opposed to reflecting and/or scattering off a substance such as smoke. Additionally, a light signal that has passed through smoke will be slightly attenuated.

As such, by rotating a laser beam emitter and light receiver of a smoke detection system and emitting pulses of light from the laser beam emitter, an indoor environment can be scanned to detect smoke. For example, such a system may be positioned in a corner of a room and rotated from zero to ninety degrees to scan the entire room for smoke. By recording the alignment, position, and orientation of the smoke detection system at the time that the smoke is detected, the approximate location of the smoke can also be determined.

In previous approaches, the components of a LiDAR smoke detection system (e.g., the laser beam emitter and the light receiver) may be co-axial (e.g., co-linear) Making the path of the outgoing light beam and the light receiver of such a system co-axial can eliminate blind spots in the detection system (e.g., areas in which the detection system may be unable to detect the presence of smoke) that may occur if the light beam and light receiver were not co-axial. However, such co-axial configurations can be optically complex, costly, and time-consuming to manufacture.

Embodiments of the present disclosure, however, can improve the field of view of such smoke detection systems and devices, and therefore reduce or eliminate any blind spots of the system, without the need for the emitter(s) and receiver(s) to be co-axial. Thus, embodiments of the present disclosure can ease the complexity, manufacturing constraints and costs of smoke detection systems and devices while maintaining a complete field of view (e.g., reducing or eliminating blind spots) for the smoke detection system or device.

In some examples, one or more embodiments include a smoke detection system comprising a laser emitter configured to emit a laser beam, and a light receiver. The light receiver may comprise a first receiver lens, wherein a field of view of the first receiver lens includes at least a portion of the laser beam. The light receiver may further comprise a second receiver lens, wherein a field of view of the second receiver lens includes at least a portion of the laser beam and includes a region between an edge of the field of view of the first receiver lens and the laser emitter.

In some examples, one or more embodiments may include a smoke detection system, comprising a laser emitter configured to emit a laser beam, a LiDAR receiver, and a processor. The LiDAR receiver may comprise a first receiver lens, wherein a field of view of the first receiver lens includes at least a portion of the laser beam. The LiDAR receiver may also include a second receiver lens, wherein a field of view of the second receiver lens includes at least a portion of the laser beam and includes a region between an edge of the field of view of the first receiver lens and the laser emitter. The processor may be configured to detect smoke based on light received by the LiDAR receiver.

In some examples, one or more embodiments may include a method of detecting smoke, comprising emitting a laser beam from a laser beam emitter while rotating the laser beam emitter and positioning a light receiver such that the light receiver is non-coaxial with the laser beam. The light receiver may comprise a first receiver lens, wherein a field of view of the first receiver lens includes at least a portion of the laser beam. The light receiver may also comprise a second receiver lens, wherein a field of view of the second receiver lens includes at least a portion of the laser beam and includes a region between an edge of the field of view of the first receiver lens and the laser emitter In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

As described herein, a fire control system may be any system designed to detect and/or provide a notification of fire events. For example, a fire control system may include smoke detection systems and/or devices (e.g., systems 100 and 200) that can sense a fire occurring in the facility, alarms (e.g., speakers, strobes, etc.) that can provide a notification of the fire to the occupants of the facility, fans and/or dampers that can perform smoke control operations (e.g., pressurizing, purging, exhausting, etc.) during the fire, and/ or sprinklers that can provide water to extinguish the fire, among other components. A fire control system may also include a control unit such as a physical fire control panel (e.g., box) installed in the facility that can be used by a user to directly control the operation of the components of the fire control system. In some embodiments, the fire control system can include a non-physical control unit or a control unit located remotely from the facility.

As used herein, the terms "light" or "beam" can include any type of light beam, such as a laser. These terms can also include pulses of light.

As used herein, the term "emitter" or "light emitter" can be any device, system, or apparatus configured to emit light. The light emitted can be pulses, such as pulses of lasers. A "light emitter" may be, for example, a LiDAR transmitter.

As used herein, the term "light receiver" can be used to describe any sensor, detector, lens, or combination thereof configured to receive light and/or to convert light into a form that is readable by an instrument. A "light receiver" may be, for example, a LiDAR receiver or an electro-optical sensor. In some embodiments, a light receiver may include a clock or processing resources. The light receiver may be configured to measure the time taken for a pulse of light to travel from an emitter, reflect and/or scatter off an object, substance, or material, and travel back to the receiver.

As used herein, the term "reflected" may be used to refer to light that is not only reflected but may be reflected and/or scattered. For example, the light may be reflected off a surface at an angle of incidence equaling the angle of reflection. Light that is incident on a surface or material can also be scattered in a multitude of directions in accordance with embodiments of the present disclosure.

FIG. 1 illustrates a system 100 for detecting smoke 117 in accordance with an embodiment of the present disclosure. As shown in FIG. 1, the system 100 may include a light emitter 101 configured to emit a beam 103. For example, the light emitter 101 may be a laser emitter, and the beam 103 may be a laser beam. In some embodiments, the light emitter 101 may be a photodiode or a laser diode. Although the beam 103 is illustrated in FIG. 1 as a single beam of light, in some embodiments, the light emitter 101 may emit pulses of light. For example, the light emitter 101 may emit a beam 103 at a particular time interval.

As illustrated in FIG. 1, the beam 103 may illuminate smoke 117. The smoke 117 (e.g., the presence of the smoke) may be detected by the system 100 when the light forming the beam 103 is reflected from the smoke 117 to a light receiver 105 of system 100. The light receiver 105 may be configured to receive reflected light as a result of the beam 103 encountering an object, substance, or material (e.g., smoke 117). In some embodiments, the light receiver 105 may be, for example, a LiDAR receiver (e.g., a LiDAR sensor).

Although not illustrated in FIG. 1 for clarity and so as not to obscure embodiments of the present disclosure, the system 100 may also include a processor configured to detect smoke based on light received through the light receiver 105. For instance, the processor may determine whether reflected light indicates the presence of smoke. The processor may do so, for example, by measuring and analyzing the intensity of reflected light received by the receiver 105. If the intensity of the reflected light is below a certain level, the processor may determine that smoke 117 is present. For example, the processor may compare the intensity level of the reflected light to that which would be expected for light reflected against a wall or another hard object; if the comparison indicates the intensity level of the reflected light is less than the expected intensity, the processor can determine that smoke 117 is present.

The processor may also determine the location of the smoke 117. For example, the processor may be able to determine the location (e.g., the exact location) of the smoke 117 with respect to the light receiver 105 by measuring the amount of time between when the laser beam 103 pulse was emitted and when the reflected light was received by the light receiver 105.

The processor may also be configured to then take an action in response to detecting smoke. For example, although not illustrated in FIG. 1 for clarity and so as not to obscure embodiments of the present disclosure, upon detecting smoke, the processor may be configured to transmit a signal to a cloud, control panel, central monitoring system, user, or other device of a fire control system indicating the smoke has been detected. The processor may also be configured to transmit data, such as motion of the emitter 101 and/or location of the smoke 117, to any of the foregoing examples. Data may be transmitted from the processor with a unique identifier for the environment (e.g., a room) in which the system 100 is located. The processor may have embedded software for analyzing and transmitting data and/or for detecting smoke 117.

The light receiver may include a first (e.g., primary) receiver lens 107 and a second (e.g., secondary) receiver lens 109. The primary receiver lens 107 and the secondary receiver lens 109 may be, for example, Fresnel lenses. In some embodiments, the sizes of lenses 107 and 109 may be proportional to the size of the area to be monitored for smoke (e.g., the larger the area to be monitored for smoke, the greater the sizes of lenses 107 and 109). The secondary receiver lens 109 may be designed to collect light reflected from smoke 117 that is much closer to detector system 100 than light reflected from smoke that is further away from detector system 100 and within the field of view of the primary receiver lens 107. Accordingly, the secondary receiver lens 109 may be significantly smaller in size than the primary receiver lens 107.

In some embodiments, the primary receiver lens 107 may be a Fresnel lens of, for example, 90-110 mm in diameter. One or both receiver lenses 107 and 109 may be molded from clear plastic. The receiver lenses 107 and 109 may be disc-shaped with multiple concentric, grooved rings. This may allow the receiver lenses 107 and 109 to collect light and direct it to a photo-sensitive element within the light receiver 105. In some embodiments, the secondary receiver lens 109 may be constructed by molding a small part of the primary receiver lens 107 at an angle to the remainder of the receiver lens 107. This would effectively make the secondary lens 109 a smaller lens within the primary receiver lens 107.

As shown in FIG. 1, the light emitter 101 and the light receiver 105 may be non-coaxial. For example, light emitter 101 may be positioned at an angle with respect to light receiver 105, and the laser beam 103 emitted by light emitter 101 and the fields of view 111 and 113 of the primary and secondary receiver lenses 107 and 109, respectively, may not be parallel, as illustrated in FIG. 1. As such, although the field of view 111 of the primary receiver lens 107 may include at least a portion of the beam 103 (e.g., field of view 111 partially overlaps the beam 103), a portion of beam 103 may be outside field of view 111 but not outside field of view 113, such that the beam 103 may also illuminate smoke 117 that is positioned outside of the field of view 111 of the primary receiver lens 107, but is not outside the field of view 113 of secondary receiver lens 109.

In some embodiments, the secondary receiver lens 109 may be attached to the primary receiver lens 107. For example, the secondary receiver lens 109 may be molded within the primary receiver lens 107. Further, the secondary receiver lens 109 may be positioned at an angle with respect to the primary receiver lens 107. As such, the field of view 111 of the primary receiver lens 107 may differ from the field of view 113 of the secondary receiver lens. Accordingly, the secondary receiver lens 109 may expand an overall field of view of the light receiver 105.

The field of view 113 of the secondary receiver lens 109 may at least partially overlap with the field of view 111 of the primary receiver lens 107. The field of view 113 of the secondary receiver lens 109 may include at least a portion of the beam 103. For instance, field of view 112 may include portions of the beam 103 that may not be within the field of view 111 of the primary receiver lens 107. Furthermore, the field of view 113 of the secondary receiver lens 109 may include (e.g., cover) a region 115 between an edge 111-1 of the field of view 111 of the primary receiver lens 107 and light emitter 101. The edge 111-1 may be between the laser beam 103 and the second receiver lens 109. Accordingly, the combined fields of view 111 and 113 of the primary and secondary receiver lenses, respectively, may capture the entire, or nearly the entire, beam 103.

The angle at which the primary receiver lens 107 is positioned with respect to the secondary receiver lens 109 may correspond to how much of beam 103 can be captured. This angle may be determined based on, for example, a distance between the emitter 101 and the receiver 105, an angle of the beam 103 with respect to the field of view 111 of the primary receiver lens 107, and/or an angle of the field of view 113 (e.g., angle of view) of the secondary receiver lens 109.

Although not shown in FIG. 1, the system 100 may include a rotation device configured to rotate the light emitter 101. The rotation device may be mechanical or electrical. It may be configured to rotate the light emitter 101 at a given speed and/or over a given range. For example, if the system 100 is set up in the corner of a room, the rotation device may rotate the light emitter 101 from 0 degrees to 90 degrees. If the emitter 101 emits pulses such as beam 103 periodically as the rotation device moves, the system 100 may be able to scan an entire room or region for smoke such as smoke 117. The rotation device may rotate the receiver 105 and the light emitter 101 together.

Figure 2:
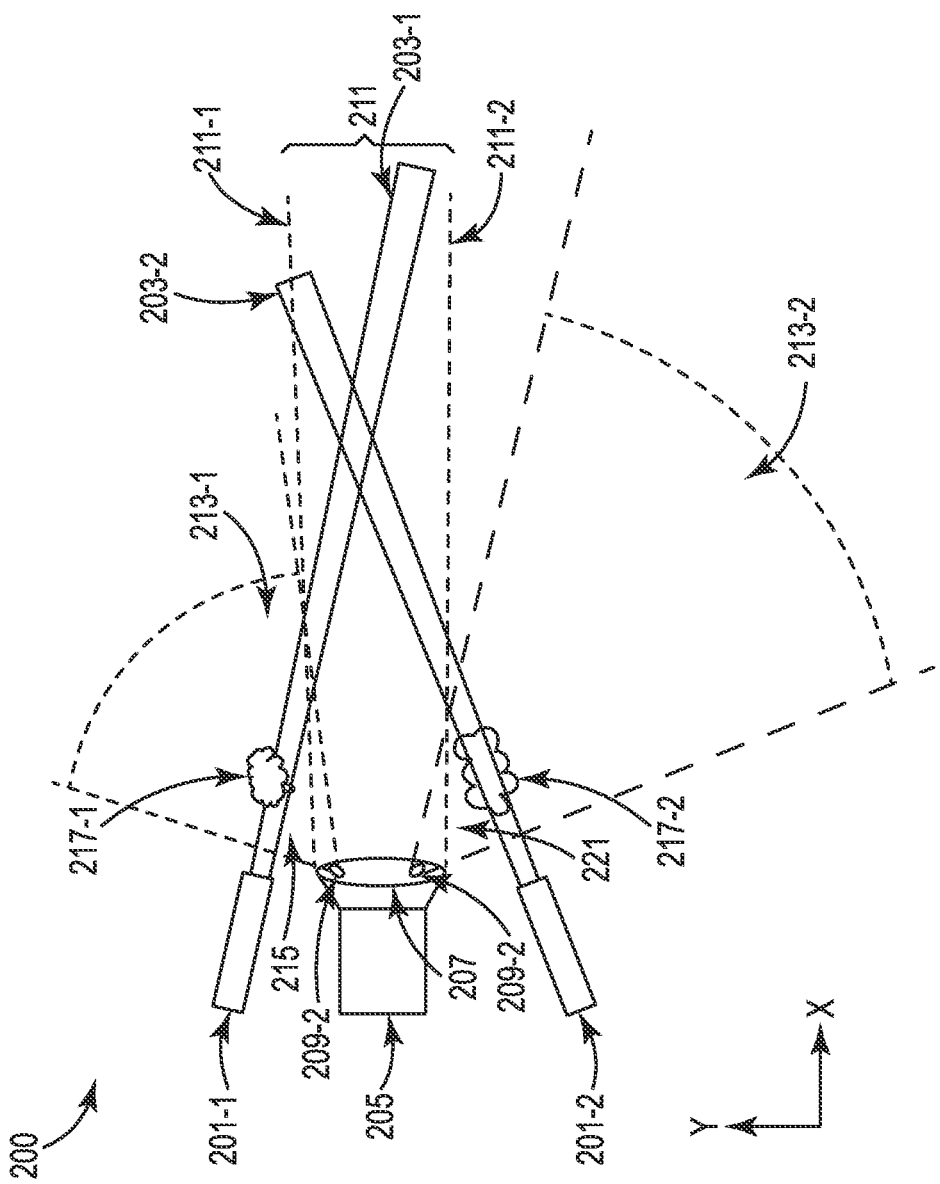
FIG. 2 illustrates a system for detecting smoke in accordance with an embodiment of the present disclosure.

FIG. 2 illustrates a system 200 for detecting smoke in accordance with an embodiment of the present disclosure. Some portions and/or elements of smoke detection system 200 can be analogous to smoke detection system 100 as shown and described in connection with FIG. 1. For example, field of view 211, and field of view edge 211-1, of primary receiver lens 207 can be analogous to field of view 111, and filed of view edge 111-1, respectively, of primary receiver lens 107 previously described in connection with FIG. 1. However, rather than a single light emitter (e.g., as shown in FIG. 1), smoke detection system 200 may include multiple light emitters 201-1 and 201-2, wherein each light emitter 201-1 and 201-2 emits a different beam (laser beams 203-1 and 203-2, respectively). Each light emitter 201-1 and 201-2 may be positioned on an opposite side of light receiver 205, wherein the light receiver 205 is configured to receive light reflected by the beams 203-1 and 203-2 off of objects, substances, and materials, such as smoke 217-1 and 217-2.

Further, the light receiver 205 of the smoke detection system 200, rather than including a primary receiver lens and a single secondary receiver lens (e.g., as shown in FIG. 1), can include a primary receiver lens 207 and a number of secondary receiver lenses 209-1 and 209-2. Secondary receiver lens 209-2 can ensure that smoke, such as smoke 217-2, can still be detected, even if it is outside of the fields of view 211 and 213-1 of the primary receiver lens 207 and other secondary receiver lens 203-1, and the emitter 201-2 can be non-coaxial with the light receiver 205.

In some embodiments, the emitter 201-2 can be positioned outside of the region 215 between the first edge 211-1 of the field of view 211 of the primary receiver lens and emitter 201-1. The field of view 213-2 of the emitter 201-2 can include at least a portion of the beam 203-2 emitted by the emitter 201-2. Additionally, the field of view 211 of receiver lens 207 may include at least a portion of the beam 203-2.

Secondary receiver lens 209-2 can have a field of view 213-2 which includes a region 221 between an edge 211-2 of the field of view 211 of the primary receiver lens 207 and the emitter 201-2. This can allow additional smoke, such as smoke 217-2, that is located outside the field of view 211 of the primary receiver lens 207 and the field of view 213-1 of the other secondary receiver lens 209-1 to be detected.

Figure 3:
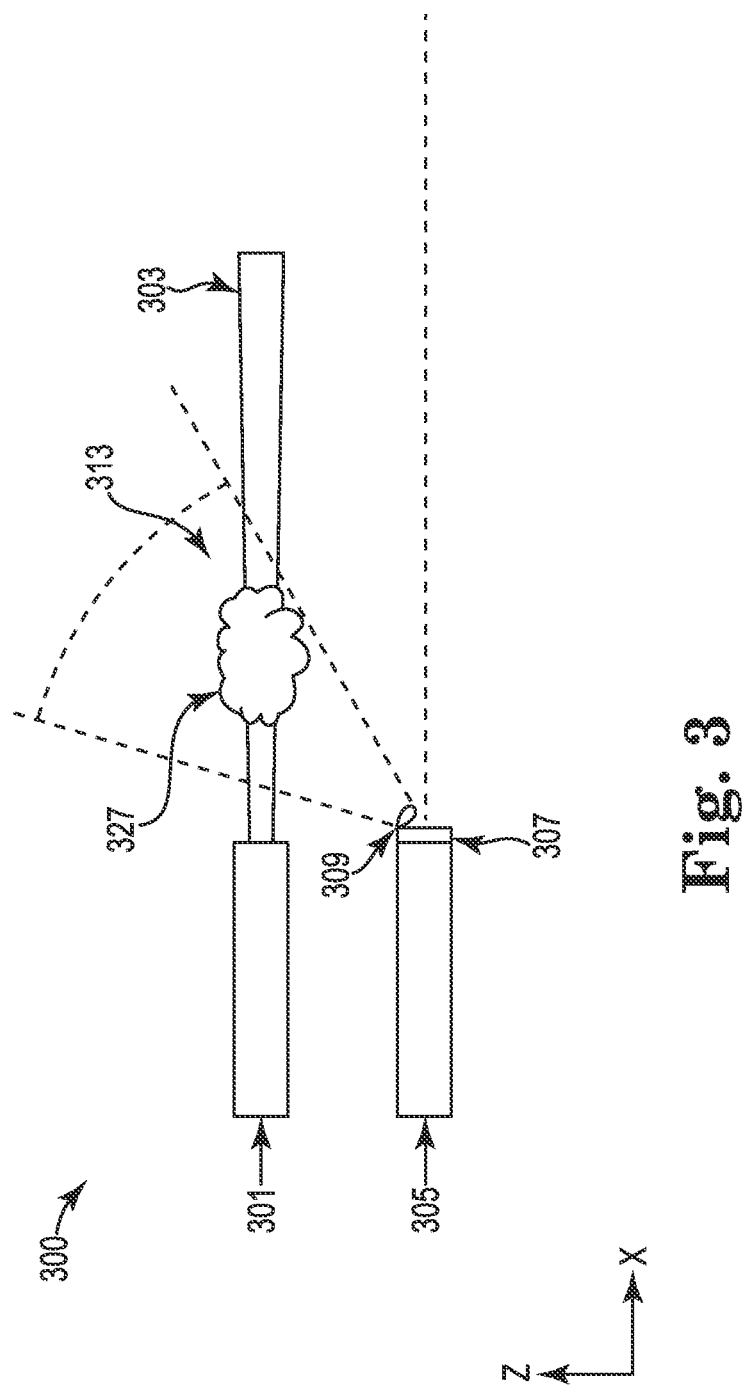
FIG. 3 illustrates a system for detecting smoke in accordance with an embodiment of the present disclosure.

FIG. 3 illustrates a system 300 for detecting smoke in accordance with an embodiment of the present disclosure. System 300 may include a light emitter 301 which is configured to emit a beam 303 and positioned vertically above or below a light receiver 305. The beam 303 may illuminate smoke 317. However, all of or a portion of the beam 303 may be outside of the field of view of the light receiver 305 (e.g., field of view 111 shown in FIG. 1 and field of view 211 shown in FIG. 2). As such, the light receiver may include a first receiver lens 307 and a second receiver lens 309. The second receiver lens 309 may be positioned at an angle with respect to the primary receiver lens 307 such that the field of view 313 of the second receiver lens overlaps with portions of the beam 303 that do not overlap with the field of view of the first receiver lens 307.

FIG. 4 illustrates a method 400 for detecting smoke (e.g., smoke 217-1 and 217-2 in FIGS. 2 and/or 117 in FIG. 1) in accordance with an embodiment of the present disclosure. As illustrated in FIG. 4, method 400, at block 402, may include emitting a laser beam (e.g., beam 103 and/or 203 of FIGS. 1 and 2, respectively) from a laser beam emitter (e.g., emitters 101 and/or 201-1 and 201-2 of FIGS. 1 and 2, respectively). Further, the beam can be emitted while rotating the laser beam emitter. For example, the laser beam emitter may be rotated with a range of motion appropriate to scan an entire room for smoke, based on the positioning of the laser beam emitter within that room. This may include, for example, rotating the emitter between 0 and 90 degrees, between 90 and 180 degrees, or between 0 and 180 degrees.

At block 404, method 400 may include positioning a light receiver (e.g., light receivers 105 and/or 205 of FIGS. 1 and 2, respectively) such that the light receiver is non-coaxial with the path of the laser beam. In some embodiments, the light receiver may comprise a primary receiver lens (e.g., lens 107 and 207) and a secondary receiver lens (e.g., lens 109, 209-1, and 209-2), as previously described herein. The field of view (e.g., field of view 111 and 211) of the primary receiver lens may include at least a portion of the laser beam, as previously described herein. The field of view (e.g., field of view 113, 213-1, and 213-2) of the secondary receiver lens may also include another portion of the laser beam, and a region (e.g., regions 115, 215 and 221) between an edge (e.g., edge 111-1, 211-1, and 211-2) of the field of view of the primary receiver lens and the laser emitter, as previously described herein.

At block 406, method 400 may include illuminating smoke via the laser beam. This illumination may occur when the path of the laser beam intersects with the smoke.

At block 408, method 400 may include detecting the smoke via light reflected from the smoke to the light receiver. For example, the light may be received by the light receiver via the primary receiver lens and/or the secondary receiver lens. For instance, at least a portion of the smoke may be positioned within the field of view of the secondary receiver lens. The smoke may be detected by measuring the intensity of the light received by the light receiver and comparing that intensity to an expected intensity for smoke, as previously described herein. If smoke is detected, the method can also include transmitting a signal indicating the presence of the smoke to at least one of another device within a fire control system, a fire control panel, a central monitoring station, a cloud, or a user, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A smoke detection system, comprising:
   a laser emitter configured to emit a laser beam;
   a light receiver, comprising:
      a first receiver lens, wherein a field of view of the first receiver lens includes at least a portion of the laser beam; and
      a second receiver lens, wherein a field of view of the second receiver lens:
         includes at least a portion of the laser beam; and
         includes a region between an edge of the field of view of the first receiver lens and the laser emitter; and
   a rotation device configured to rotate the laser emitter.

2. The system of claim 1, wherein the edge of the field of view of the first receiver lens is between the laser beam and the second receiver lens.

3. The system of claim 1, wherein the field of view of the first receiver lens and the field of view of the second receiver lens at least partially overlap.

4. The system of claim 1, wherein the laser emitter and the light receiver are non-coaxial.

5. The system of claim 1, further comprising an additional laser emitter positioned outside of the region and configured to emit an additional laser beam, wherein the field of view of the first receiver lens includes at least a portion of the additional laser beam.

6. The system of claim 5, wherein the light receiver further comprises a third receiver lens, wherein a field of view of the third receiver lens:
   includes at least a portion of the additional laser beam; and
   includes a region between an additional edge of the field of view of the first receiver lens and the additional laser emitter.

7. The system of claim 1, wherein at least a portion of the laser beam is outside of the field of view of the first receiver lens but not outside of the field of view of the second receiver lens.

8. The system of claim 1, wherein the laser emitter is a laser diode.

9. A smoke detection system, comprising:
   a laser emitter configured to emit a laser beam;
   a Light Detection and Ranging (LiDAR) receiver, comprising:

a first receiver lens, wherein a field of view of the first receiver lens includes at least a portion of the laser beam; and a second receiver lens, wherein a field of view of the second receiver lens:

includes at least a portion of the laser beam; and includes a region between an edge of the field of view of the first receiver lens and the laser emitter; and a processor configured to detect smoke based on light received by the LiDAR receiver.

10. The apparatus of claim 9, wherein the second receiver lens is attached to the first receiver lens.

11. The apparatus of claim 9, wherein the second receiver lens is molded within the first receiver lens.

12. The apparatus of claim 9, wherein the second receiver lens is positioned at an angle with respect to the first receiver lens.

13. The apparatus of claim 12, wherein the angle is determined based on at least one of:

a distance between the laser emitter and the LiDAR receiver; and an angle of the laser beam with respect to the field of view of the first receiver lens.

14. The apparatus of claim 9, wherein the first receiver lens and the second receiver lens comprise Fresnel lenses.

15. A method of detecting smoke, comprising:

emitting a laser beam from a laser beam emitter while rotating the laser beam emitter; and positioning a light receiver such that the light receiver is non-coaxial with the laser beam, wherein the light receiver comprises:

a first receiver lens, wherein a field of view of the first receiver lens includes at least a portion of the laser beam; and a second receiver lens, wherein a field of view of the second receiver lens:

includes at least another portion of the laser beam; and includes a region between an edge of the field of view of the first receiver lens and the laser emitter.

16. The method of claim 15, further comprising illuminating smoke via the laser beam.

17. The method of claim 16, further comprising detecting the smoke via light reflected from the smoke to the light receiver.

18. The method of claim 17, wherein at least a portion of the smoke is positioned within the field of view of the second receiver lens.

19. The method of claim 15, wherein the laser beam emitter is rotated between 90 and 180 degrees.

* * * * *